United States Patent [19]
Kawada et al.

[11] Patent Number: 5,868,215
[45] Date of Patent: Feb. 9, 1999

[54] VIBRATION ISOLATING SUPPORT STRUCTURE FOR AN AXLE CASE

[75] Inventors: Hirohiko Kawada; Norihiro Ishii; Koji Iwaki; Hidemi Harada, all of Amagasaki, Japan

[73] Assignee: Kanzaki Kokyukoki Mfg. Co., Ltd., Japan

[21] Appl. No.: 652,946

[22] Filed: May 24, 1996

[30]     Foreign Application Priority Data

Jun. 9, 1995 [JP] Japan .................................. 7-143111

[51] Int. Cl.⁶ ................................................ B60K 17/24
[52] U.S. Cl. ........................................ 180/381; 180/382
[58] Field of Search ................................... 180/300, 377, 180/381, 382; 248/638

[56]             References Cited

U.S. PATENT DOCUMENTS

| | | | |
|---|---|---|---|
| 2,036,378 | 5/1936 | Anderson | 180/382 X |
| 3,828,873 | 8/1974 | Oestmann . | |
| 4,019,600 | 4/1977 | Master et al. | 180/382 |
| 4,089,386 | 5/1978 | Balchick | 180/382 X |

*Primary Examiner*—F. J. Bartuska
*Attorney, Agent, or Firm*—Sterne, Kessler, Goldstein & Fox, P.L.L.C.

[57]                ABSTRACT

An axle case, housing therein axles and a transmission for driving the axle, provided with a mount boss for being mounted to case mounting portions provided on a body frame of a vehicle and having insertion bores for mounting bolts, and including vibration isolating members which are each fixedly positioned on each mount boss and are provided with a portion positioned thereon and a portion extending into the insertion bore, so that, when the mount boss is coupled with the case mounting portion, the portion of the vibration isolating member positioned on the mount boss contacts with the case mounting portion. Thus, the axle case and body frame can be simply coupled with each other by using the vibration isolating members. The axle case is preferably divided vertically into an upper and a lower portion through a horizontal joint surface. When the axle case is molded, the insertion bores for the mounting bolts for mounting the mount boss can simultaneously be cast into the axle case, whereby there is no need for machining the axle case after it is molded.

11 Claims, 8 Drawing Sheets

VIBRATION ISOLATING SUPPORT STRUCTURE FOR AN AXLE CASE

BACKGROUND OF THE INVENTION

1. Field of the Invention

The present invention relates to a structure for mounting onto a body frame of a vehicle an axle case which houses therein axles and a transmission for changing the speed of the vehicle.

2. Related Art

In a conventional running vehicle, the axle case which houses therein the axles and the transmission for changing the vehicle's speed is provided at both sides of an axle housing portion with a mount boss so as to be directly mounted therethrough to case mounting portions provided on the body frame. However, when the axle case is directly mounted thereto, vibrations caused by the transmission are directly transmitted to the body frame and also to an operator riding on the vehicle, resulting in that the operator feels uncomfortable or uneasy when driving the vehicle.

SUMMARY OF THE INVENTION

In order to prevent such vibrations caused by the axle case, a vibration isolating material is conventionally interposed between the axle case and the vehicle body frame. For example, as shown in FIG. 11, a mounting bolt bore 1b is vertically disposed in a mount boss 1a of an axle case. On a case mounting portion 2a of the vehicle body frame are mounted vibration isolating members 3 and 4 through which bolt insertion bores all disposed. A mounting bolt 6 and a nut 7 are used to mount the mount boss 1a to the case mounting portion 2a through the vibration isolating members 3 and 4, thereby mounting the axle case 1 to the body frame. In addition, reference numeral 5 designates a collar for preventing the vibration isolating members 3 and 4 from being over tightened.

In such construction, however, a bent portion or tab of the case mounting portion 2a of the body frame must be larger in width L1 than outer diameter of the vibration isolating members 3 and 4 for mounting them onto the mount boss 1a. Therefore, the body frame of the vehicle, which is not provided with vibration isolating means, cannot be directly mounted. Thus, a case mounting portion which is larger in width is required, resulting in higher manufacturing cost.

In order to solve the above-mentioned problem, the present invention adopts the following construction: An axle case housing therein axles and a transmission for driving the axle is provided with mount bosses for mounting therethrough the axle case to case mounting portions provided on the body frame of the vehicle and having insertion bores for mounting bolts. Vibration isolating members are fixedly positioned on the mount bores. Each has a portion positioned on the mount boss and a portion extending through the insertion bore, so that, when the mount bosses are coupled to the case mounting portion, the portions positioned on the mount bosses and the case mounting portions contact at their vibration isolating members.

The axle case comprises an upper half housing and a lower half housing which are separable from each other along a joint surface which is substantially horizontal with respect to a longitudinal axis of the axle. The mount boss is provided in the upper half housing. A longitudinal axis of the insertion bore extends substantially perpendicularly to the joint surface.

In another embodiment, the axle case comprises an upper half housing and a lower half housing separable from each other along a joint surface which includes the longitudinal axis of the axle. Mount bosses are provided in both the upper half and lower half housings. The longitudinal axis of the insertion bore extends substantially perpendicular to the joint surface.

It is an object of the present invention that a vibration isolating support structure is not required for the case mounting portion because the vibration isolating structure is adapted for the axle case, so that the axle case and body frame are simple to couple with each other by applying the vibration isolating means. Also, an escape prevention means is applied to the vibration isolating members housed in the mount boss, so that an improvement in assembly efficiency is achieved and the vibration isolating members are prevented from being lost or changed in position when the axle case moves during the assembly process. Further, since the case mounting portion of the body frame is placed on the vibration isolating members mounted on the axle case, even the parts of the body frame of the vehicle which are not applied with vibration isolating means can be simply changed to have the vibration isolating support structure.

It is another object of the present invention that the axle case is preferably made vertically separable into an upper half and lower half through horizonal joint surface and the mounting bores for the vibration isolating members extend vertically across the upper and lower axle cases and are preferably open vertically. Thus the insertion bores for the mounting bolts for the mounting bosses can be simultaneously formed when molding the axle case, whereby there is no need to apply a mechanical process such as drilling, to the axle case after it is molded. As a result, the axle case can be less expensive to produce.

Other objects and advantages of the present invention will become apparent from the following detailed description when viewed in conjunction with the accompanying drawings, which set forth certain embodiments of the invention.

DETAILED DESCRIPTION OF THE PREFERRED EMBODIMENTS

Next, explanation will be given of one embodiment of the present invention in accordance with the drawings.

Figure 1:
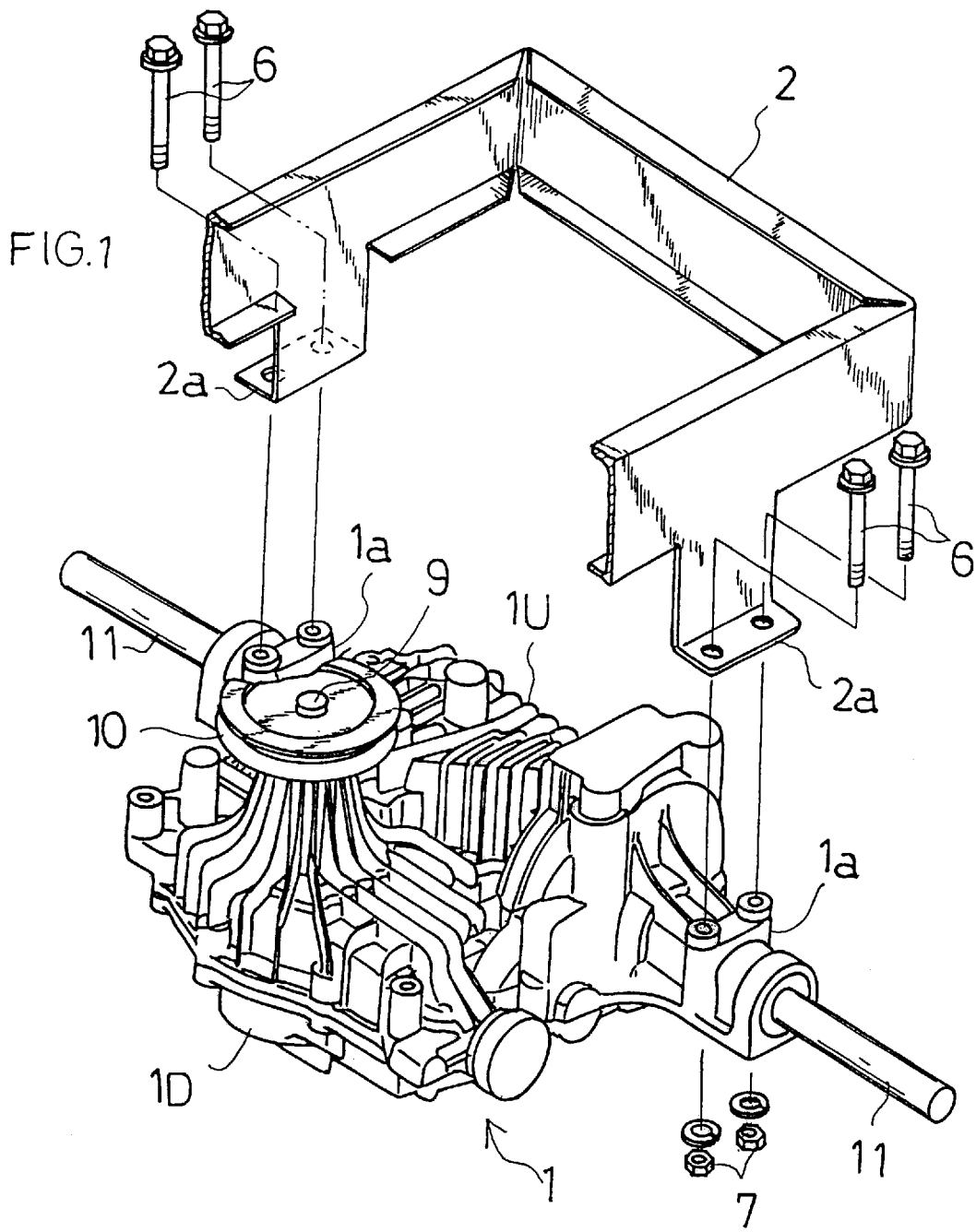
FIG. 1 is a perspective exploded view showing an axle case mounted to a body frame of a vehicle.
Figure 2:
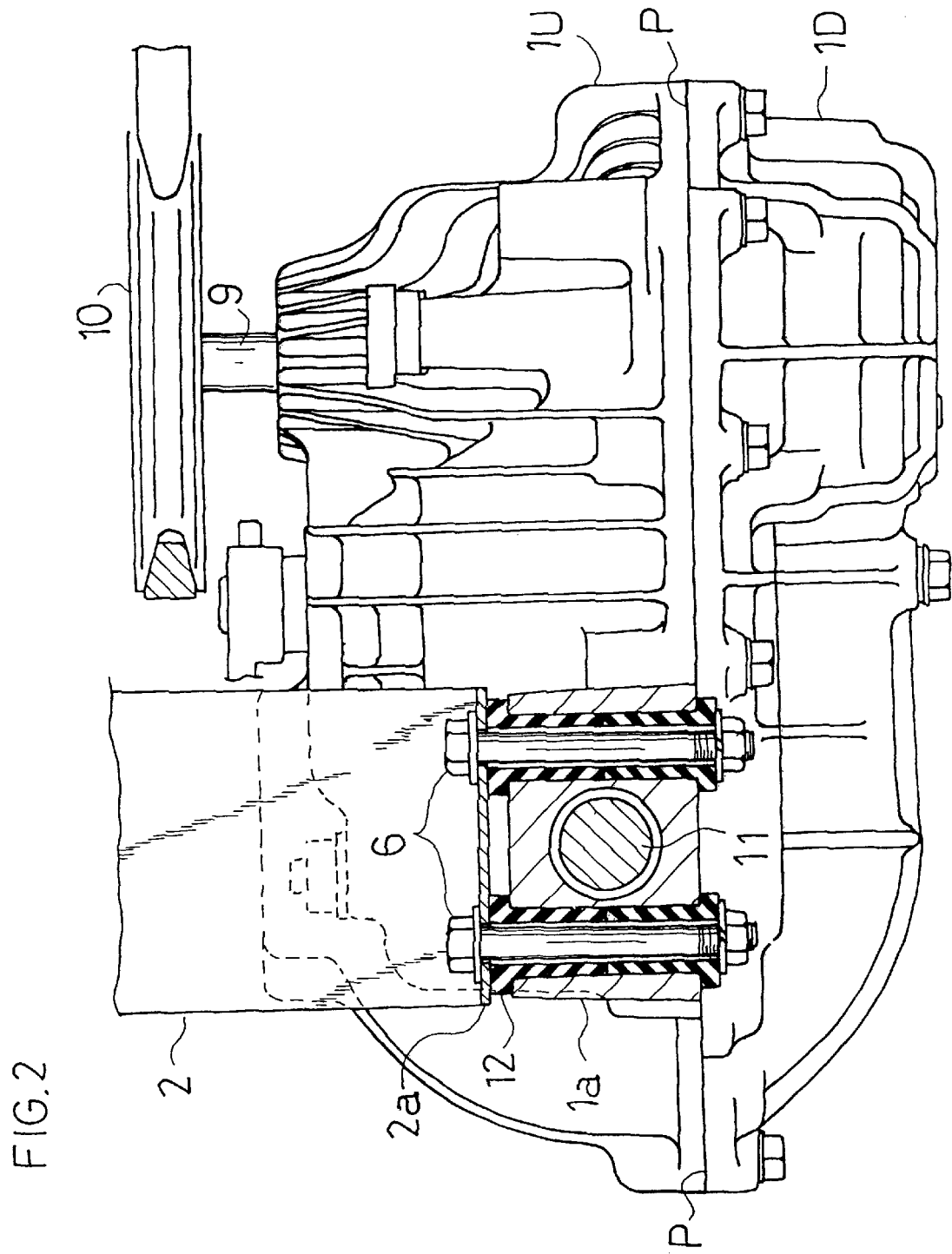
FIG. 2 is a partial sectional view of the axle case of FIG. 1 mounted to the body frame.

In FIGS. 1 and 2, a vibration isolating support structure of the present invention is shown, which is used to mount an axle case or casing 1, housing therein a transmission, onto a body frame 2 of a working vehicle, such as a mower tractor. Axle case 1 comprises an upper half housing 1U and a lower half housing 1D which are vertically separable from each other along a horizontal joint surface P—P at the vertical center of axle case 1. In axle case 1 are housed a hydraulic stepless transmission (not shown) for changing the vehicle speed, axles 11 and gears (not shown) for transmitting power from the hydraulic stepless transmission to the axles 11.

Figure 8:
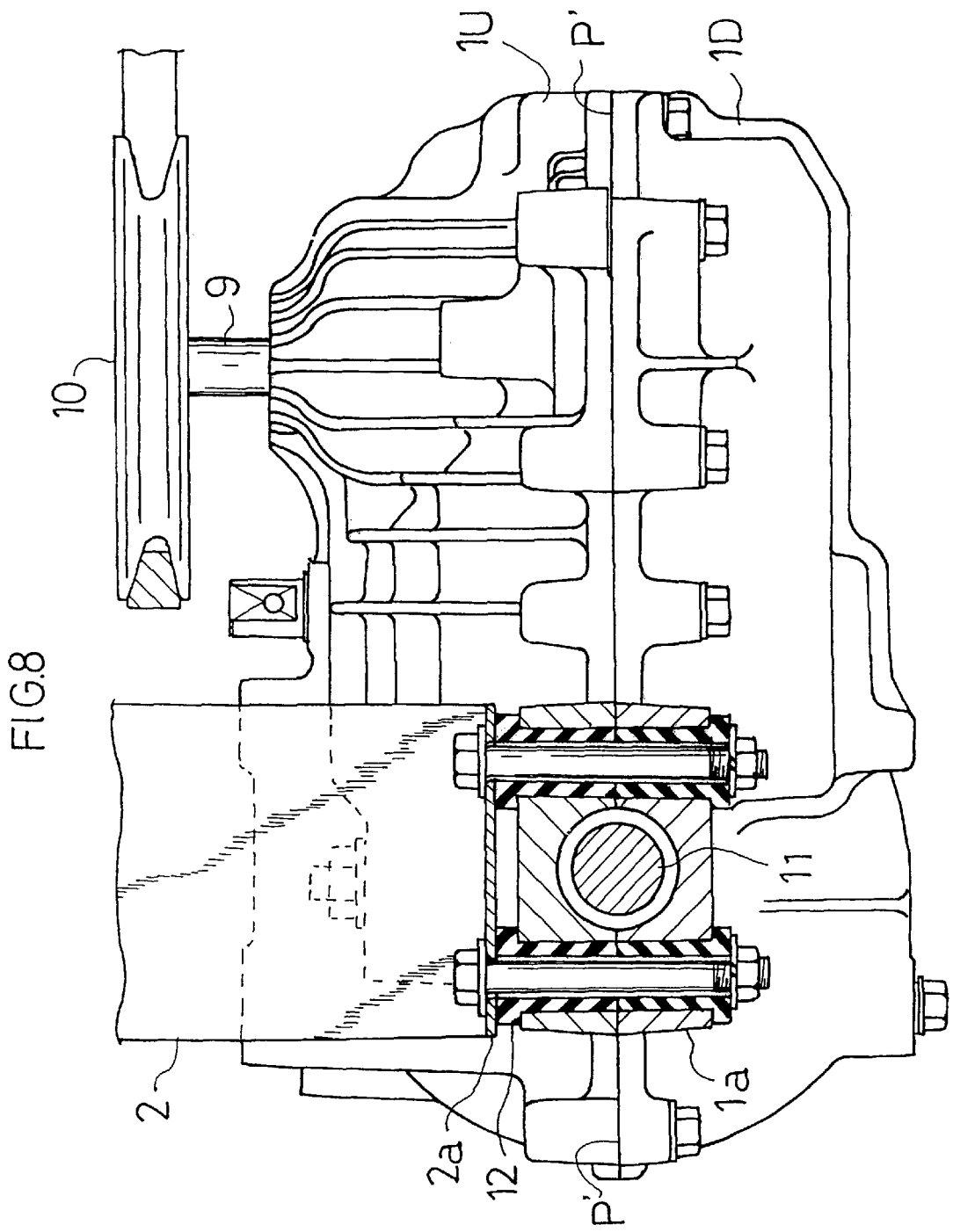
FIG. 8 is a partial sectional side view of a modified embodiment of the axle case mounted to the body frame, wherein the axle case is longitudinally separated along the axis of the axle.

An input shaft 9 projects vertically from the upper surface of upper half housing 1U. An input pulley 10 is fixed to input shaft 9, thereby inputting power to the axle case 1 from an engine of the vehicle or the like (not shown). Power is introduced into axle case 1 and the speed is changed by the transmission so as to drive axles 11. Axles 11, as shown in FIGS. 1 and 2, are offset upwardly from joint surface P—P so as to be rotatably supported by upper half housing IU. As shown in FIG. 8, axles 11 may be supported by both the upper and lower half housings 1U and 1D along joint surface P'—P'. In other words, the longitudinal axis of each axle 11 is substantially parallel to joint surface P—P (FIG. 2) or is included in the plane of joint surface P'—P' (FIG. 8).

Housing portions for axles 11 project outwardly from both the left and right sides at the ends of axle case 1 and are provided with mount bosses 1a for mounting axle case 1 to body frame 2. Insertion bores perforate each mount boss 1a perpendicular to joint surface P—P. A case mounting portion 2a of body frame 2 is placed on each mount boss 1a atop vibration isolating members 12 disposed in the insertion bores. Axle case 1 is fixed to body frame 2 through mounting bolts 6 disposed in the insertion bores.

Figure 3:
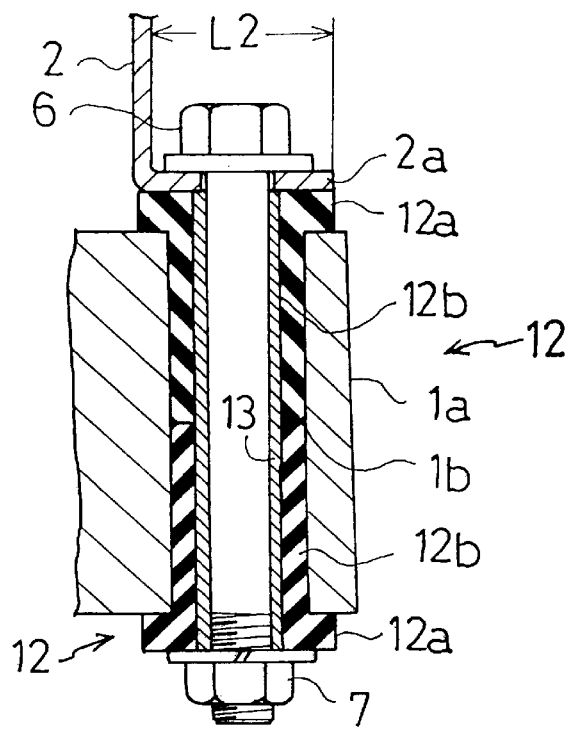
FIG. 3 is a sectional side view showing a first embodiment of a vibration isolating support structure of the present invention.

Next, explanation will be given on a first embodiment of the vibration isolating member 12 shown in FIG. 3. In this embodiment, vibration isolating member 12 is made of rubber and includes two ring-like shaped flanges or first portions 12a engageable with the upper surface and the lower surface of mount boss 1a. A cylindrical or second portion 12b is integral with flanges 12a and is insertable into the insertion bores 1b formed in mount boss 1a. The cylindrical portion 12b of the vibration isolating member 12 is fixed into insertion bore 1b so as not to vertically escape therefrom by press-fitting into insertion bore 1b or by applying an adhesive to the outer periphery of cylindrical portion 12a. The optimum vibration isolating effect can be obtained by changing the kind of rubber used to create member 12, and/or the thickness or shape of member 12.

A collar 13 for preventing vibration isolating member 12 from being excessively tightened is provided in a through bore in vibration isolating member 12 along the axis thereof. Case mounting portion 2a which is rectangularly bent from the lower portion of body frame 2 is placed on vibration isolating member 12. Mounting bolt 6 is disposed within the insertion bore by inserting it into collar 13 and case mounting portion 2a and it is tightened by a nut 7, thereby fixing mount boss 1a to case mounting portion 2a of the vehicle through vibration isolating member 12.

Figure 11:
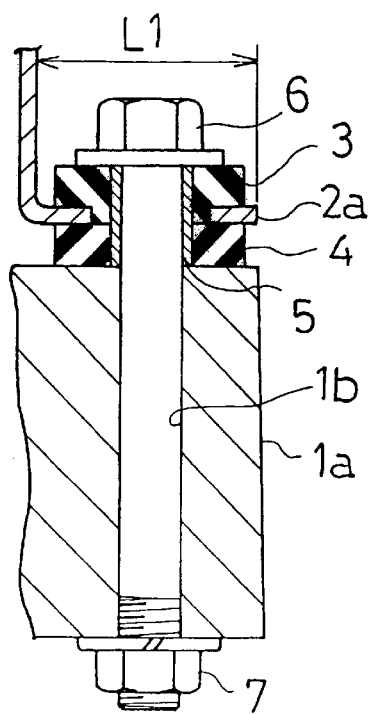
FIG. 11 is a sectional side view of a conventional vibration isolating structure.

Thus, flange 12a of vibration isolating member 12 contacts at the upper surface thereof with the lower surface of case mounting portion 2a of body frame 2 to thereby obtain the vibration isolating effect. Width L2 of bent portion 2a of case mounting portion 2 is large enough to receive the configuration of flange 12a, yet smaller than width LI of a conventional bent portion, as shown in FIG. 11. Also, body frame 2 is larger in an area for receiving vibration isolating member 12 than in the conventional configuration, resulting in an improvement in the vibration isolating effect. Further, the insertion bore in mount boss 1a are not drilled, but, in this embodiment, they are casted simultaneously when axle case 1 is molded, thereby eliminating machining after molding.

Figure 4:
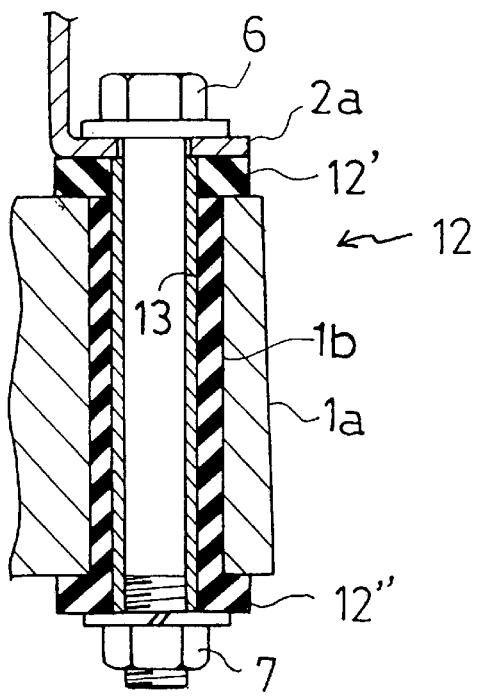
FIG. 4 is a sectional side view showing a second embodiment of the same.

Next, explanation will be given on a second embodiment of the vibration isolating member 12 shown in FIG. 4, which is made of the same material as the above embodiment and comprises an upper member or first portion 12' and a lower member or second portion 12". Upper member 12' is separate from vibration isolating member 12 and forms a washer with respect to case mounting portion 2a. Lower member 12" is integral with vibration isolating member 12 and forms a flanged cylindrical portion equal in axial length to insertion bore 1b. Cylindrical portion 12" and collar 13 are fixedly inserted into insertion bore 1b as described above, from the bottom thereof. Case mounting portion 2a of body frame 2 contacts at the lower surface thereof with the upper surface of flange 12'. Mounting bolt 6 is inserted into collar 13 and case mounting portion 2a and is tightened by a nut 7, thereby fixing mount boss 1a to body frame 2.

Figure 5:
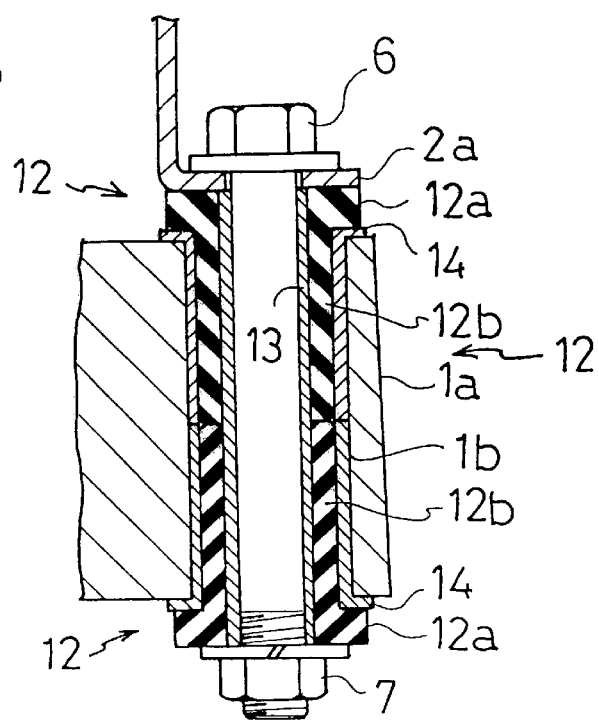
FIG. 5 is a sectional side view of a third embodiment of the same.

Next, explanation will be given on a third embodiment of vibration isolating member 12 as shown in FIG. 5. The third embodiment is used as a mounting structure when rotation of axle 11 applies a large torque from mount boss 1a of axle case 1 to case mounting portion 2a of the body frame 2. In this embodiment, upper and lower collared washers 14, of the same construction, are fixedly inserted into insertion bore 1b, one from the top and one from the bottom thereof. Two vibration isolating members 12, constructed the same as those in the first embodiment, are fixedly inserted into collar portions of the flanged washers 14. A collar 13 is inserted into vibration isolating members 12 from the top or bottom thereof. Case mounting portion 2a of body frame 2 is placed on the upper surface of flange 12a of vibration isolating member 12. Mounting bolt 6 is inserted into collar 13 and is tightened by nut 7. Mount boss 1a is fixed to body frame 2, such that collared washers 14 protect the vibration isolating members 12 from being subjected to excessive torque applied to mount boss 1a.

Figure 6:
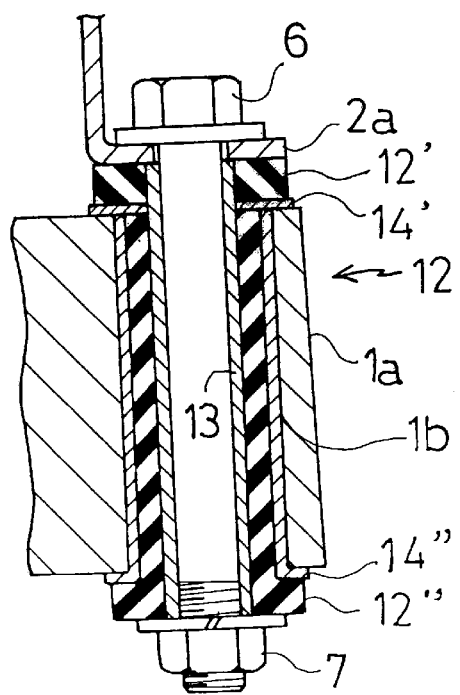
FIG. 6 is a sectional side view of a fourth embodiment of the same.

Next, explanation will be given on a fourth embodiment of the vibration isolating member 12 shown in FIG. 6. The fourth embodiment, as is the third embodiment, is a mount structure to be applied when axle 11 rotates to apply an excessive torque from mount boss 1a of axle case 1 to case mounting portion 2aof body frame 2. In this embodiment, a washer comprises an upper and a lower member as in FIG. 4 above. One washer 14' has no collar. The other washer 14" has a collar equal in axial length to insertion bore 1b. Vibration isolating member 12 is constructed the same as the second embodiment. Collared washer 14", flanged cylindrical member 12" and collar 13 are fixedly inserted into insertion bore 1b from the bottom thereof. Washer 14' and flange 12' are placed on the upper surface of mount boss 1a. On the upper surface of flange 12' is placed the case mounting portion 2a of body frame 2. Mounting bolt 6 is inserted into case mounting portion 2a and collar 13 and is tightened by nut 7 whereby mount boss 1a is fixed to body frame 2. The orientation of flange 12' and 12" in the second and fourth embodiments may be reversed vertically, that is, flange 12' and 12" may be positioned upside down from the position shown in the second and fourth embodiments.

Figure 7:
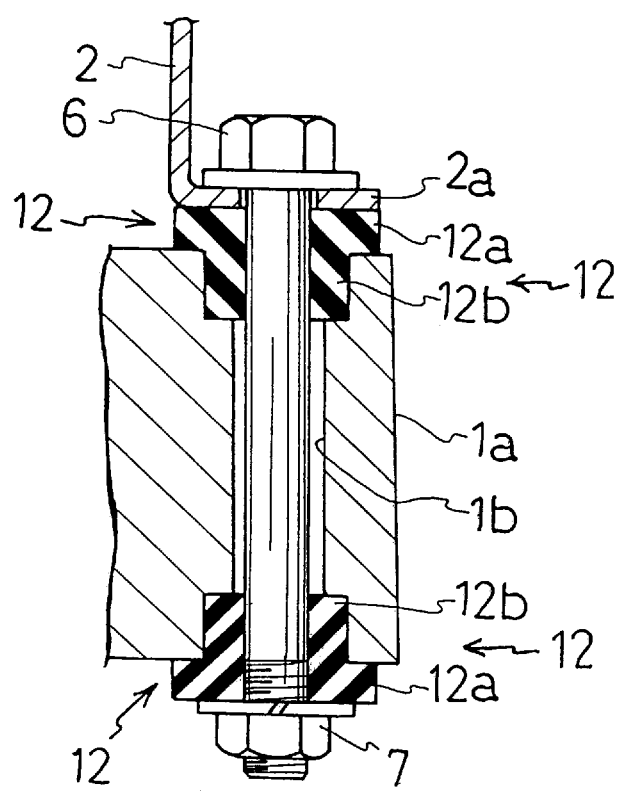
FIG. 7 is a sectional side view of a fifth embodiment of the same.

Next, explanation will be given of a fifth embodiment of the vibration isolating member 12 shown in FIG. 7. The fifth embodiment is the same as the first embodiment in that flange or first portion 12a is integrally formed with cylindrical or second portion 12b. However, cylindrical portion 12b is smaller in axial length to reduce the amount of material used, and collar 13 is eliminated, thereby reducing the manufacturing cost. Adhesive is applied onto the outer periphery of cylindrical portion 12b of vibration isolating member 12 so that the vibration isolating member 12 is fixedly adhered to the inner periphery of insertion bore 1b, thereby preventing vibration isolating member 12 from escaping from the mount boss 1a before it is assembled with body frame 2. When case mounting portion 2a of body frame 2 is placed on flange 12a so as to assemble mount boss 1a, mounting bolt 6 is inserted into insertion bore 1b and is tightened by nut 7. The tightening torque is controlled thereby eliminating the need for collar 13.

Figure 9:
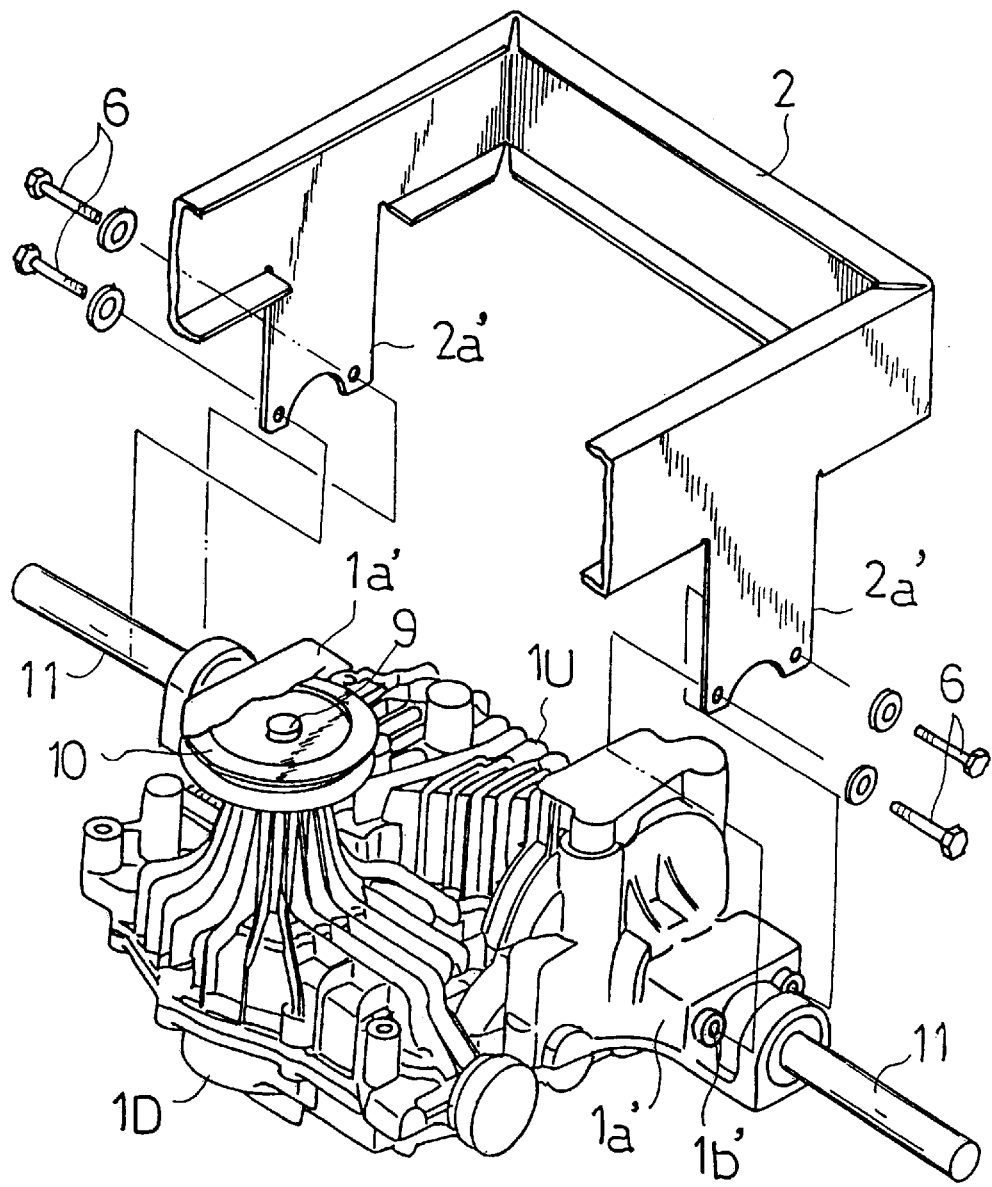
FIG. 9 is another modified embodiment of the same, wherein the case mounting portion of the body frame has no bent portion and the insertion bores for the mounting bolts for the mounting boss extend horizontally.
Figure 10:
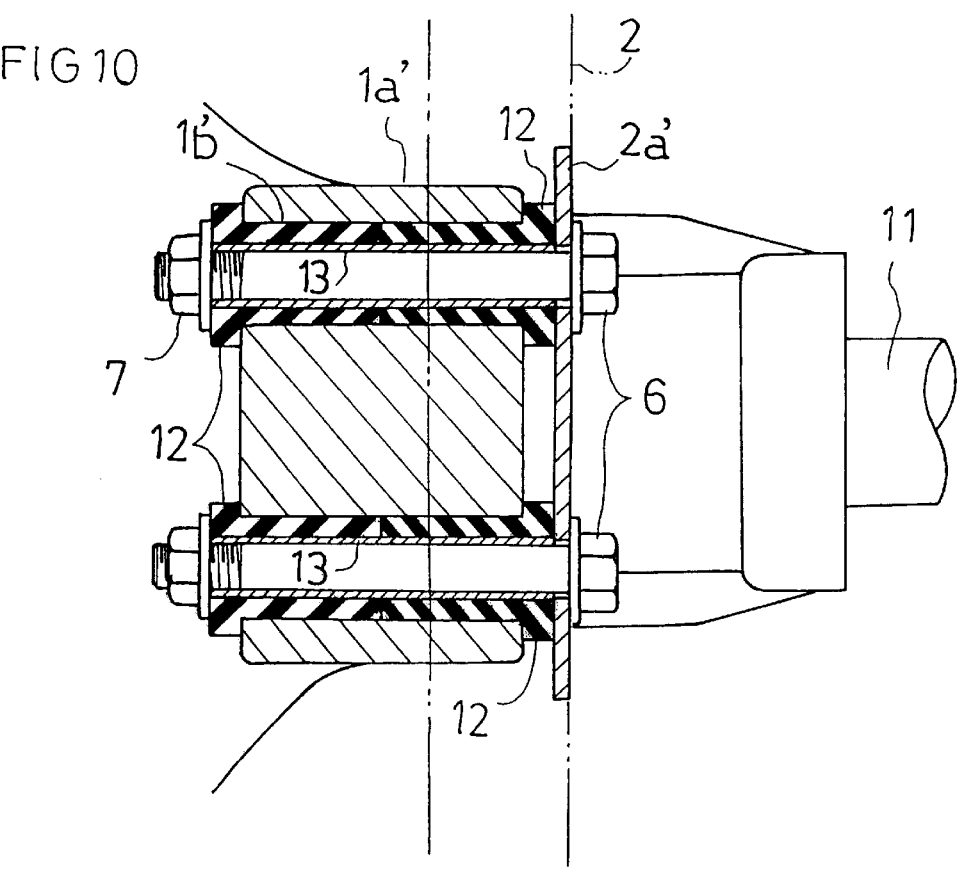
FIG. 10 is a sectional plan view of mounting bores in the body frame.

In the alternative, case mounting portion 2a' of body frame 2 may extend vertically rather than horizontally. As shown in FIGS. 9 and 10, an insertion bore 1b' horizontally perforates mount boss 1a' such that the longitudinal axis of insertion bore 1b' extends parallel to joint surface P—P. Vibration isolating member 12, collar 13 and washer 14 are mounted the same as in the first through fifth embodiments. That is each vibration isolating member 12 is housed horizontally in insertion bore 1b'. One of the flanges of vibration isolating member 12 contacts with case mounting portion 2a' to fix axle case 1 to body frame 2, thereby obtaining the same vibration isolating effect as those shown in FIGS. 1 through 8.

While various preferred embodiments have been shown and described, it will be understood that there is no intent to limit the invention by such disclosure, but rather, it is intended to cover all modifications and alternative constructions falling within the spirit and scope of the invention as defined in the appended claims.

What is claimed is:

1. An axle driving apparatus including a vibration isolating support structure for an axle case comprising:
    a casing having outwardly projecting ends;
    an axle disposed in said casing, said axle being supported in said outwardly projecting ends of said casing;
    a transmission disposed in said casing;
    a mount boss provided on said outwardly projecting ends of said casing;
    an insertion bore perforating said mount boss;
    means for isolating vibration of the axle drive apparatus having a first portion which is positioned on said mount boss and which contacts a case mounting portion of a vehicle to which said axle driving apparatus is mounted and a second portion which extends into said insertion bore; and
    a mounting bolt disposed within said insertion bore and within said portion of said isolating means which extends into said insertion bore, which couples said mount boss to the vehicle.

2. An axle driving apparatus according to claim 1, wherein said casing comprises:
    an upper housing;
    a lower housing separable from said upper housing along a joint surface which is substantially parallel to a longitudinal axis of said axle;
    wherein said mount boss is disposed in one of said upper and said lower housings and a longitudinal axis of said insertion bore extends substantially perpendicular to said joint surface.

3. An axle driving apparatus according to claim 1, wherein said casing comprises:
    an upper housing;
    a lower housing separable from said upper housing along a joint surface which is substantially parallel to a longitudinal axis of said axle;
    wherein said mount boss is disposed in one of said upper and said lower housings and a longitudinal axis of said insertion bore extends substantially parallel to said joint surface.

4. An axle driving apparatus according to claim 1, wherein said first and second portions of said vibration isolating means are integral.

5. An axle driving apparatus including a vibration isolating support structure for an axle case comprising:
    a casing having outwardly projecting ends;
    an axle disposed in said casing, said axle being supported in said outwardly projecting ends of said casing;
    a transmission disposed in said casing;
    a plurality of mount bosses provided on said outwardly projecting ends of said casing;
    an insertion bore perforating each of said mount bosses;
    means for isolating vibration of the axle drive apparatus having a first portion which is positioned on each of said mount bosses and which contacts a case mounting portion of a vehicle to which said axle driving apparatus is mounted and a second portion which extends into said insertion bore; and
    a mounting bolt disposed within said insertion bore and within said portion of said isolating means which extends into said insertion bore, which couples said mount boss to the vehicle.

6. An axle driving apparatus including a vibration isolating support structure for an axle case comprising:
    a casing having outwardly projecting ends;
    an axle disposed in said casing, said axle being supported in said outwardly projecting ends of said casing;
    a transmission disposed in said casing;
    a mount boss provided on said outwardly projecting ends of said casing;
    an insertion bore perforating said mount boss;
    means for isolating vibration of the axle drive apparatus having a first portion which is positioned on said mount boss and which contacts a case mounting portion of a vehicle to which said axle driving apparatus is mounted and a second portion which extends into said insertion bore; and
    a mounting bolt disposed within said insertion bore and within said portion of said isolating means which extends into said insertion bore, which couples said mount boss to the vehicle;
    wherein said casing comprises an upper housing and a lower housing separable from said upper housing along a joint surface which is substantially parallel to a longitudinal axis of said axle;
    wherein a longitudinal axis of said insertion bore extends substantially perpendicular to said joint surface.

7. An axle driving apparatus according to claim 6, wherein said axle is offset upwardly from said joint surface so as to be rotatably supported by said upper housing.

8. An axle driving apparatus according to claim 6, wherein said longitudinal axis of said axle is substantially included in a plane of said joint surface, and said axle is supported by both said upper and lower housings along said joint surface.

9. An axle driving apparatus including a vibration isolating support structure for an axle case comprising:

a casing having outwardly projecting ends;

an axle disposed in said casing, said axle being supported in said outwardly projecting ends of said casing;

a transmission disposed in said casing;

a plurality of mount bosses provided on said outwardly projecting ends said casing;

an insertion bore perforating each of said mount bosses;

means for isolating vibration of the axle drive apparatus having a first portion which is positioned on each of said mount bosses and which contacts a case mounting portion of a vehicle to which said axle driving apparatus is mounted and a second portion which extends into said insertion bore; and a mounting bolt disposed within said insertion bore and within said portion of said isolating means which extends into said insertion bore, which couples said mount boss to the vehicle;

wherein said casing comprises an upper housing and a lower housing separable from said upper housing along a joint surface which is substantially parallel to a longitudinal axis of said axle;

wherein a longitudinal axis of said insertion bore extends substantially perpendicular to said joint surface.

10. An axle driving apparatus according to claim 9, wherein said axle is offset upwardly from said joint surface so as to be rotatably supported by said upper half housing.

11. An axle driving apparatus according to claim 9, wherein said longitudinal axis of said axle is substantially included in a plane of said joint surface, and said axle is supported by both said upper and lower housings along said joint surface.

* * * * *